United States Patent
Yamamoto et al.

(10) Patent No.: US 9,193,871 B2
(45) Date of Patent: Nov. 24, 2015

(54) COMPOSITE PARTICLES AND METHOD FOR PRODUCTION THEREOF

(75) Inventors: Tsutomu Yamamoto, Iwaki (JP); Harunobu Saito, Iwaki (JP); Mika Onai, Iwaki (JP); Atsuki Terabe, Iwaki (JP); Masaru Mikami, Iwaki (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 324 days.

(21) Appl. No.: 13/577,351

(22) PCT Filed: Feb. 1, 2011

(86) PCT No.: PCT/JP2011/052019
§ 371 (c)(1),
(2), (4) Date: Oct. 5, 2012

(87) PCT Pub. No.: WO2011/102214
PCT Pub. Date: Aug. 25, 2011

(65) Prior Publication Data
US 2013/0028948 A1    Jan. 31, 2013

(30) Foreign Application Priority Data

Feb. 22, 2010   (JP) .................................. 2010-036356

(51) Int. Cl.
*C09C 1/36* (2006.01)
*C09D 7/12* (2006.01)
(Continued)

(52) U.S. Cl.
CPC ............ *C09C 1/3661* (2013.01); *C09D 7/1225* (2013.01); *C01P 2002/84* (2013.01); *C01P 2006/12* (2013.01); *C01P 2006/13* (2013.01);
(Continued)

(58) Field of Classification Search
CPC . C09C 1/3661; C09D 7/1225; C01P 2002/84; C01P 2006/12; C01P 2006/13; C08K 3/22; C08K 9/06; C08K 9/02
See application file for complete search history.

(56) References Cited

U.S. PATENT DOCUMENTS 4,125,412 A   11/1978   West
4,447,271 A   5/1984    Howard et al.
(Continued)

FOREIGN PATENT DOCUMENTS

GB   1008652   11/1965
GB   2 108 097  5/1983
(Continued)

OTHER PUBLICATIONS

Kagaku Daijiten 5 (Encyclopaedia Chimica 5) (reduced-size edition), Kagaku Daijiten edition committee, May 5, 1996, p. 18 with a concise explanation—a full translation will be submitted upon the Examiner's request.

*Primary Examiner* — Trevor Love
(74) *Attorney, Agent, or Firm* — Hamre, Schumann, Mueller & Larson, P.C.

(57) ABSTRACT

Disclosed are titanium dioxide-containing composite particles which can maintain whiteness of natural titanium dioxide even after calcination step, and can provide titanium dioxide-containing composite particles having excellent weather resistance. In each of the composite particles, at least one oxide layer containing silicon oxide and zirconium oxide is provided as coating components of titanium dioxide. That is, provided are composite particles including a base that contains titanium dioxide and at least one oxide layer that contains silicon oxide and zirconium oxide provided on the base, and a method of producing the composite particles.

12 Claims, 2 Drawing Sheets

(51) Int. Cl.
  *C08K 3/22* (2006.01)
  *C08K 9/06* (2006.01)
  *C08K 9/02* (2006.01)

(52) U.S. Cl.
  CPC ... *C08K 3/22* (2013.01); *C08K 9/02* (2013.01); *C08K 9/06* (2013.01)

(56) References Cited

U.S. PATENT DOCUMENTS

| | | |
|---|---|---|
| 6,200,375 B1 | 3/2001 | Guez et al. |
| 2004/0154040 A1 | 8/2004 | Ellis |
| 2005/0228112 A1 | 10/2005 | Takahashi et al. |
| 2011/0038598 A1 | 2/2011 | Okuda et al. |

FOREIGN PATENT DOCUMENTS

| | | | | |
|---|---|---|---|---|
| JP | 53-033228 | | 3/1978 | |
| JP | 58-084863 | | 5/1983 | |
| JP | 8-048940 | | 2/1996 | |
| JP | 2003-112923 | | 4/2003 | |
| JP | 2003112923 | * | 4/2003 | ............ C01G 23/04 |
| JP | 2004-083904 | | 3/2004 | |
| JP | 2007-084374 | | 4/2007 | |
| JP | 2008-069193 | | 3/2008 | |
| JP | 2008-081578 | | 4/2008 | |

* cited by examiner

Fig. 3

COMPOSITE PARTICLES AND METHOD FOR PRODUCTION THEREOF

TECHNICAL FIELD

The present invention relates to composite particles containing titanium dioxide, and a method of producing the same.

BACKGROUND ART

Titanium dioxide is widely used in various fields as white pigments, UV shielding materials, photocatalyst materials, etc. Specifically, exterior use utilizing titanium oxide with suppressed photocatalytic property, such as exterior walls for buildings, coating compositions for buildings, or parts or coating compositions for automobiles, has been recently increased. These materials used in such applications are required to have high weather resistance and endurance since these are exposed to the elements over a long period. Titanium dioxide is sometimes blended in a fluorine material having excellent heat resistance and high chemical resistance to enhance weather resistance and endurance.

Photocatalytic action by titanium oxide, however, decomposes not only organic substances which causes stains but also necessary organic components in a coating composition, a resin composition, etc., which leads to discoloration, fading, and deterioration of coating compositions and materials. As a result, weather resistance and endurance of parts deteriorate in some cases.

Thus, some studies have been made so far for suppressing photocatalytic activity of a material containing titanium dioxide by providing a coating layer of oxides on the surface of titanium dioxide particles to thereby enhancing weather resistance of the titanium dioxide particles.

For example, Patent Literature 1 discloses a method of producing weather-resistant titanium dioxide by depositing a coating layer of high-density silica on the surface of the titanium dioxide, and then depositing alumina thereon.

Patent Literature 2 discloses a method for improving photochemical stability of titanium dioxide by forming a layer that consists of porous hydrous silica and alumina hydrate on the surface of $TiO_2$, calcining the $TiO_2$, and then further forming a hydrous metal oxide layer that comprises at least one metal selected from the group consisting of silicon, zirconium, and aluminum.

CITATION LIST

Patent Literature

Patent Literature 1: JP Sho-53-33228 A
Patent Literature 2: JP 2008-81578 A

SUMMARY OF INVENTION

Technical Problem

Regardless of the above studies, long-period exterior weather resistance and endurance of the products containing titanium oxide are still insufficient, and deterioration causes in some cases. Thus, further improvement in quality is required. Additionally, another problem has been found. That is, formation of the coating layer indeed enhances weather resistance, but leads to deterioration of whiteness, which is one of innate features of titanium dioxide. For example, the Patent Literature 2 discloses a conventional technique which includes forming a layer that consists of the hydrous silica and hydrous alumina on the surface of $TiO_2$, and calcining the $TiO_2$. In this process, decrease of whiteness is occurred during calcination, and there is a problem on deterioration of innate excellent properties of $TiO_2$ as a white pigment. For titanium dioxide, which is used as a white pigment, such deterioration which may affect color or tone of a final product may lead a severe failure in some cases, and rapid improvement has been demanded.

Solution to Problem

The present inventors have studied components for covering titanium dioxide, and have found a way of preparing titanium dioxide-containing composite particles which can maintain innate whiteness of titanium dioxide even after calcination, and can provide titanium dioxide-containing composite particles having excellent weather resistance. Thus, they have completed the present invention. More specifically, the present inventors have found that use of zirconium oxide together with silicon oxide as a coating component of titanium dioxide provides a pigment of titanium dioxide-containing composite particles with maintained high whiteness, high weather resistance, and high endurance. In a preferred embodiment, at least one hydroxide layer containing aluminum hydroxide is further provided on the oxide layer, to thereby produce glossy titanium dioxide-containing composite particles.

That is, according to the first aspect of the present invention, the present invention relates to composite particles comprising:
a base that contains titanium dioxide, and
at least one oxide layer that contains silicon oxide and zirconium oxide provided on the base.

In a preferred embodiment, the oxide layer further includes aluminum oxide.

In another preferred embodiment, the composite particles further comprise at least one hydroxide layer that contains aluminum hydroxide.

The oxide layer may further contain at least one element selected from the group consisting of titanium, tin, phosphorus, zinc, and antimony. The hydroxide layer may further contain at least one element selected from the group consisting of silicon, titanium, cerium, tin, phosphorus, zinc, antimony, and zirconium.

The proportion of the oxide layer is preferably 1.5 to 35% by mass of the base. When the composite particles have the hydroxide layer, the proportion of the hydroxide layer is preferably 0.01 to 20% by mass, in terms of oxides, of the base.

The proportion of the silicon oxide is preferably 1 to 15% by mass, and that of the zirconium oxide is preferably 0.5 to 10% by mass of the base. When the oxide layer contains aluminum oxide, the proportion thereof is preferably 0.01 to 10% by mass for 100% by mass of the base.

When the hydroxide layer contains aluminum hydroxide, the proportion thereof is preferably 0.01 to 10% by mass for 100% by mass of the base in terms of oxides.

The composite particles are preferably in a form of isolated solid particles.

Preferably, the composite particles are further provided with a polysiloxane layer.

According to the second aspect of the invention, the present invention relates to a method of producing the composite particles, comprising the steps of:

(1) forming a first coating layer that contains a silicon component and a zirconium component on the surface of base particles that contain titanium oxide; and
(2) separating coating layer-containing particles from the resultant mixture obtained through the step (1), followed by water-washing and calcining the particles.

In a preferred embodiment, the first coating layer further containing an aluminum component, together with the silicon component and the zirconium component, is formed in the step (1).

Calcination temperature in the step (2) is preferably 600 to 950° C.

The silicon-containing component is preferably a silicate, or a hydrate or a solvate thereof.

The zirconium-containing component is a zirconium salt, or a hydrate or a solvate thereof.

The aluminum-containing component to be added in the step (1) is preferably an aluminate, or a hydrate or a solvate thereof.

In a preferred embodiment, the method further includes, subsequently to the step (2), the steps of:
(3) forming a second coating layer on the calcined product by mixing the calcined product obtained through the step (2) and an aluminum-containing component in a medium, and
(4) isolating composite particles from the resultant mixture obtained through the step (3).

The aluminum-containing component to be added in the step (3) is preferably an aluminate, or a hydrate or a solvate thereof.

According to the third aspect of the present invention, the present invention relate to a composition containing the composite particles. The composition is a cosmetic composition, a coating composition, a resin composition, or an ink composition.

According to the fourth aspect of the present invention, the present invention relates to a molded article formed from the resin composition.

Advantageous Effects of Invention

The composite particles of the present invention maintain a high whiteness even after calcination while they still keep innate pigment properties of titanium dioxide. Furthermore, the particles have high long-term weather resistance over long period of time, as well as excellent light fastness, UV-shieldability, and visible ray transmittance. Thus, the present invention can provide titanium dioxide-containing composite particles which may be suitable for various applications in which high weather resistance and light fastness are required.

DESCRIPTION OF EMBODIMENTS

Hereafter, the present invention will be described in detail. In this text, "titanium dioxide" and "titanium oxide" both mean the same compound which is represented by a chemical formula $TiO_2$.

(Composite Particles)

The composite particles according to the first aspect of the present invention comprise a base that contains titanium dioxide, and at least one oxide layer that contains silicon oxide and zirconium oxide provided on the base.

The composite particles according to the present invention include a base that contains titanium dioxide. Titanium dioxide has a high index of refraction, and thus effectively scatters visible rays.

The proportion of the base in the composite particles is not particularly limited. The lower limit of the proportion is preferably 55% by mass, more preferably 71% by mass, still more preferably 84% by mass of the total mass of the composite particles. The upper limit of the proportion is preferably 98.5% by mass, more preferably 96.5% by mass, still more preferably 92% by mass of the total mass of the composite particles. The less the proportion of the titanium dioxide in the composite particles is, the more the amount of the coating layer is. On the contrary, the more the proportion of the titanium dioxide is, the less the amount of the coating layer is. Accordingly, the proportion of the titanium dioxide in the composite particles less than 55% by mass of the total mass of the composite particles may impair some properties required as innate properties of titanium oxide such as opacifying property. On the contrary, when the proportion of the titanium dioxide is more than 98.5% by mass, effects by coating may be insufficient, which may lead to low weather resistance or low light fastness.

The base may contain other components than titanium dioxide, but the lower limit of the proportion of the titanium dioxide in the base is preferably 90% by mass, more preferably 95% by mass of the base. The proportion of less than 90% by mass of the base may impair some properties required as innate properties of titanium dioxide-containing particles such as whiteness and opacifying property.

The composite particles according to the present invention have at least one oxide layer that contains, on the periphery of the base, silicon oxide and zirconium oxide.

Silicon oxide is a component for improving weather resistance and light fastness of the composite particles that contains titanium dioxide as a main component. Furthermore, silicon oxide can prevent sintering among base particles on calcination. Zirconium oxide is a component for maintaining whiteness of the titanium dioxide-containing particles, which generally tends to deteriorate by calcination. The present invention provides titanium dioxide-containing composite particles with excellent whiteness, gloss, and weather resistance by providing coating layer that contains silicon oxide and zirconium oxide, which can provide the above advantages, on the base that contains titanium dioxide.

The oxide layer may further contain aluminum oxide. Aluminum oxide is a component which can improve weather resistance or light fastness of a pigment that contains titanium dioxide as a main component, similarly to silicon oxide. Aluminum oxide can also provide gloss, easy dispersibility, and opacifying property to the pigment.

The proportion of the oxide layer in the composite particles is preferably, but not limited to, 1.5 to 35 by mass for 100% by mass of the base. The lower limit of the proportion is more preferably 3.5% by mass, still more preferably 8% by mass, whereas the upper limit thereof is preferably 24% by mass, still more preferably 16% by mass for 100% by mass of the base. When the mass of the oxide layer is less than 1.5% by mass of the base, effects by coating may be insufficient, which may lead to deterioration of weather resistance or light fastness of the composite particles. On the contrary, when the proportion exceeds 35% by mass, some properties required as innate properties of titanium dioxide-containing particles such as opacifying property may be deteriorated.

The proportion of the silicon oxide in the oxide layer is preferably, but not limited to, 1 to 15% by mass for 100% by mass of the base. The lower limit of the range is more preferably 2% by mass, still more preferably 3% by mass, whereas the upper limit is more preferably 10% by mass, still more preferably 6% by mass of the base. The proportion of the silicon oxide in the oxide layer within the range of 1 to 15% by mass for 100% by mass of the base is preferred in that sintering among base particles will be prevented.

The proportion of the zirconium oxide in the oxide layer is preferably, but not limited to, 0.5 to 10% by mass of the base. The lower limit of the range is more preferably 1% by mass, still more preferably 3% by mass, whereas the upper limit is more preferably 8% by mass, still more preferably 6% by mass of the base. The proportion of the zirconium oxide in the oxide layer within the range of 0.5 to 10% by mass of the base is preferred in that high weather resistance will be provided to the composite particles, and deterioration of whiteness during calcination will be prevented.

When aluminum oxide is present in the oxide layer, the proportion of the aluminum oxide is preferably, but not limited to, 0.01 to 10% by mass of the base. The lower limit of the proportion is more preferably 0.5% by mass, still more preferably 2% by mass, whereas the upper limit is more preferably 6% by mass, still more preferably 4% by mass. The proportion over the 10% by mass may deteriorate whiteness, coloring effect, and opacifying property.

The structure of the oxide layer is not particularly limited, and may be a monolayer structure, or a multilayer structure which includes two or more intermediate layers. Here, a monolayer structure of the oxide layer means a structure in which silicon oxide, zirconium oxide, and optionally aluminum oxide and other metal oxide components are included as a complex in a single monolayer. The multilayer structure which includes two or more intermediate layers means a structure in which several separate layers, including an (intermediate) layer that contains silicon oxide as a main component, and an (intermediate) layer that contains zirconium oxide as a main component, and optionally an (intermediate) layer that contains aluminum oxide as a main component, or a layer containing other metal oxide components, are laminated in the oxide layer. When the oxide layer is in a multilayer structure, it is not necessary to have clear borders between layers. Although not limited, preferable is a multilayer structure including titanium dioxide, a first layer that contains silicon oxide provided on the surface of the titanium dioxide, a second layer that contains zirconium oxide provided on the first layer, and a third layer that contains aluminum oxide provided on the second layer in view of compatibility with titanium dioxide, barrier performance, and gloss of particles.

The oxide layer may further contain at least one element selected from the group consisting of titanium, tin, phosphorus, zinc, and antimony. These elements are preferable in that the weather resistance of the composite particles can be improved.

When the oxide layer contains at least one element selected from the group consisting of titanium, tin, phosphorus, zinc, and antimony, the proportion of these element is preferably, but not limited to, 0.01 to 20% by mass, more preferably 0.01 to 10% by mass, still more preferably 0.01 to 5% by mass for 100% by mass of the base in terms of oxides. The proportion of the elements present in the oxide layer exceeding 20% by mass of the base may deteriorate whiteness, coloring effect, and opacifying property.

The composite particles according to the present invention may further contain other elements than those listed above as long as physical properties of the composite particles are not impaired.

According to a preferred embodiment of the present invention, the composite particles may further include a hydroxide layer containing aluminum hydroxide on the periphery of the oxide layer.

When the composite particles comprise the hydroxide layer, the proportion of the hydroxide layer in the composite particles may be, but not limited to, 0.01 to 20% by mass in terms of oxides for 100% by mass of the base. The lower limit of the proportion is more preferably 0.5% by mass, still more preferably 1.5% by mass. The upper limit of the proportion is preferably 15% by mass, still more preferably 10% by mass. The proportion of the hydroxide layer exceeding 20% by mass for 100% by mass of the base may impair some properties such as opacifying property, which are required as innate properties of titanium oxide.

It is hardly necessary to mention, but the total of masses of the ingredients including the base that contains titanium dioxide, the oxide layer, the hydroxide layer, and optional components equals to the mass of the composite particles (namely, the ingredients totals 100% by mass of the composite particles).

When the hydroxide layer contains aluminum hydroxide, the proportion of the aluminum hydroxide is preferably 0.01 to 10% by mass in terms of oxides for 100% by mass of the base. The lower limit is more preferably 0.5% by mass, still more preferably 1% by mass, whereas the upper limit is more preferably 5% by mass, still more preferably 3% by mass for 100% by mass of the base. The proportion of the aluminum hydroxide exceeding 10% by mass may impair some properties such as opacifying property, which are required as innate properties of titanium oxide.

The hydroxide layer may further contain at least one element selected from the group consisting of silicon, titanium, cerium, tin, phosphorus, zinc, antimony, and zirconium. The hydroxide layer may further contain other elements than those listed above as long as physical properties of the composite particles are not impaired.

The scope of the composite particles of the present invention encompasses a material present in a form of isolated solid particles, and dispersion containing such solid particles in a medium. Among them, a material present in a form of isolated solid particles is preferred since it is not affected by the type or property of solvents when blended.

The composite particles of the present invention preferably have a whiteness measured according to JIS K 5101, that is, W value, of 92 or higher in a state of isolated solid particles. Titanium dioxide itself has high whiteness, but the whiteness of titanium dioxide tends to be lowered during calcination performed for forming the oxide layer. The present invention uses silicon oxide and zirconium oxide as coating components of titanium dioxide, and therefore, will provide titanium dioxide-containing composite particles with maintained high whiteness even when calcination is performed for forming the coating layers.

The composite particles of the present invention are glossy, and maintain high gloss even after an accelerated weather resistance test. Thus, the composite particles of the present invention are excellent in weather resistance.

(Method of Producing Composite Particles)

The second aspect of the present invention relates to a method of producing the composite particles, comprising the steps of:

(1) forming a first coating layer that contains a silicon component and a zirconium component on the surface of base particles that contain titanium dioxide; and
(2) separating coating layer-containing particles from the resultant mixture obtained in the step (1), followed by calcining the particles.

The first coating layer formed in the step (1) may further contain an aluminum component, together with the silicon component and the zirconium component.

The step (1) is for depositing coating components on the surface of the base particles that contain titanium dioxide.

The method of forming the first coating layer on the surface of the base particles is not particularly limited, and any known method such as a liquid phase method or a gas phase method may be employed. For example, the following method may be mentioned. First, the base particles are suspended in a suitable medium, to prepare suspension (slurry) that contains titanium dioxide in the base. Then, silicon-containing component and zirconium-containing component are added to and mixed with the suspension, to deposit precursor components for oxides on the surface of the base. Hereafter, this method is referred to as "a (the) first coating process".

The first coating method is further explained below. Examples of the medium include, but not particularly limited to, liquid media such as water and alcohols. Especially, water is preferred since it is available at a low cost. The amount of the medium is appropriately selected depending on dispersibility of the components. For example, the medium may be used in an amount of 0.5- to 100-fold mass of the total mass of titanium dioxide component, silicon-containing component, zirconium-containing component, and optional components such as aluminum-containing component and other components.

Examples of the base particles containing titanium dioxide include particulate bases known as pigments and the like, such as titanium oxide particles or complex oxides containing titanium oxide, and flaky bases such as titanium oxide-coated mica. These materials may be converted into desired slurry by adding them in a medium such as water, and then dispersing the materials by a suitable stirrer. Among the materials, titanium oxide ($TiO_2$) particles are preferred in view of their high light reflectance, and the titanium oxide particles produced by processes called the chloride process or the sulfuric acid process are preferred.

The chloride process and the sulfuric acid process are both well-known in the related art as processes of producing titanium dioxide. The chloride process comprises the steps of reacting rutile ore and carbon with chlorine gas at a high temperature of about 1000° C. to synthesize titanium tetrachloride ($TiCl_4$) (chlorinated step) and taking out titanium tetrachloride from gas released from the oven, and oxidizing the titanium tetrachloride under high speed ejection to synthesize titanium dioxide particles (oxidizing process). Sulfuric acid process comprises the steps of dissolving a raw material ilmenite ($FeO.TiO_2$) in a concentrated sulfuric acid (dissolving step in concentrated sulfuric acid), which is followed by separation of iron as iron sulfate ($FeSO_4$), and hydrolyzing the resultant titanium sulfate ($TiOSO_4$) with water to precipitate titanium hydroxide (hydrolysis step), which is followed by washing with an acid and then with water, and calcining the titanium hydroxide at a higher temperature (calcination step).

The primary particle diameter of the particulate base is preferably 0.1 to 3 µm. The lower limit of the primary particle diameter of the base is more preferably 0.2 µm, whereas the upper limit thereof is more preferably 1.0 µm. The diameter of 0.1 to 3 µm is preferred in that high scatterability can be expected.

In this text, a primary particle diameter means a unidirectional particle diameter (µm) (the interval between two parallel lines sandwiching a particle) determined in a visual field of an image observed by transmission electron microscope (TEM) taken at 20,000 magnification. It is determined as an average value of unidirectional particle diameters in a predetermined number (for example, 1000 particles) of particles which appear independently and does not overlap another particle in a TEM image.

In the first coating process, a way of forming the oxide layer is not particularly limited. As an example, a process of forming three layers of silicon oxide, zirconium, oxide, and aluminum oxide successively is mentioned. First, a silicon-containing component is added to slurry that contains $TiO_2$ particles, followed by neutralization and aging. Next, a zirconium-containing component is added to the slurry, followed by neutralization and aging. After that, an aluminum-containing component is added to the slurry, followed by neutralization and aging. Thus, coating layers of hydroxides of silicon, zirconium, and aluminum are formed. Composite particles containing coating layers of hydroxides are then calcined, to form oxide layers.

The above method is an example, and silicon-containing component, zirconium-containing component, and aluminum-containing component may be added in any order. In this case, the coating layer of added component is arranged from inside to outside according to the addition order. When a single layer containing two or three components is required, the components to be present in the single layer are added as a single portion, and then aged.

The silicon-containing component is not particularly limited, and examples thereof include silicates such as sodium silicate, potassium silicate, and magnesium silicate, or hydrates or solvates thereof, such as ethyl silicate, silica gel, and hydrous silica.

The zirconium-containing component is not particularly limited, and examples thereof include zirconium halides such as tetrachlorozirconium, tetrabromozirconium, and tetraiodozirconium; zirconium salts such as zirconium oxyacetate, zirconium oxychloride, zirconium oxyiodide, zirconium oxynitrate, and zirconium sulfate; or hydrates or solvates thereof, such as zirconium alkoxides. Among them, zirconium salts or hydrates or solvates thereof are preferred in view of easy handleability and high dispersibility in aqueous medium.

The aluminum-containing component is not particularly limited, and examples thereof include aluminates such as sodium aluminate, or aluminum hydroxide, aluminum alkoxide, aluminum sulfate, aluminum nitrate, and aluminum chloride; or hydrates or solvates thereof, such as aluminum chelates. Among them, aluminates or hydrate or thereof is preferred in view of solubility in water and easy handleability.

The amount of the silicon-containing component to be added is not particularly limited. It is preferably 1 to 15% by mass in terms of $SiO_2$ for 100% by mass of the base particles containing titanium dioxide. The lower limit of the above range is more preferably 2% by mass, and still more preferably 3% by mass, whereas the upper limit is more preferably 10% by mass, and still more preferably 6% by mass. The amount of the silicon-containing component within the range of 1 to 15% by mass for 100% by mass of the base particles is preferred in that sintering among base particles during calcination will be prevented.

The amount of the zirconium-containing component to be added is not particularly limited. It is preferably 0.5 to 10% by mass in terms of $ZrO_2$ for 100% by mass of the base particles. The lower limit of the above range is more preferably 1% by mass, still more preferably 3% by mass, whereas the upper limit is more preferably 8% by mass, still more preferably 6% by mass. The amount of the zirconium-containing component within the range of 0.5 to 10% by mass for 100% by mass of the base particles is preferred in that high weather resistance will be provided and decrease of whiteness during calcination will be prevented.

When the aluminum-containing component is present in the composite particles, the proportion is not particularly limited. The proportion is preferably 0.01 to 10% by mass for 100% by mass of the base particles. The lower limit thereof is more preferably 0.5% by mass, still more preferably 2% by mass, whereas the upper limit is more preferably 6% by mass, still more preferably 4% by mass. The proportion exceeding 10% by mass of the aluminum-containing component may deteriorate whiteness, coloring effect, and opacifying property.

Then the step (2) will be explained. The step (2) is for separating the coating layer-containing particles from the resultant mixture obtained through the step (1), followed by water-washing and separating, and then calcining the particles.

A way of separating composite particles from a mixture (e.g. suspension, slurry, etc.) is not particularly limited. Composite particles may be separated by a known separating technique such as filtration under an ordinary pressure or under reduced pressure, centrifugation, or decantation.

Calcination of thus-separated particles will convert precursors of silicon oxide, zirconium oxide, and aluminum oxide into corresponding oxides, to form oxide layers on the surface of the base. The temperature on calcination is not particularly limited, but a temperature of not lower than 600° C. but not higher than 950° C. is preferred. The lower limit of the temperature on calcination is more preferably 650° C., still more preferably 700° C., particularly preferably 800° C. Especially, calcination is preferably performed at a temperature over 800° C. since weather resistance of the composite particles will be enhanced.

The period of time for calcination is preferably 0.3 to 3 hours. The lower limit thereof is more preferably 0.5 hours. The upper limit thereof is more preferably 2 hours, still more preferably 1 hour.

In a preferred embodiment, the method of the present invention further includes, subsequently to the step (2), the steps of:
(3) forming a second coating layer on the calcined product obtained through the step (2), and
(4) isolating composite particles from the mixture obtained through the step (3).

The step (3) is for forming the second coating layer on the calcined product obtained through the step (2) by mixing the calcined product and an aluminum-containing component in a medium.

The second coating layer consists of hydroxides mainly including aluminum hydroxide. Such hydroxide layer will serve to enhance weather resistance and light fastness which titanium dioxide innately has, and also will serve to enhance dispersibility of the composite particles in a resin.

In this text, the "aluminum hydroxide" is a compound which is also called alumina hydrate, and is represented by a chemical formula, $Al(OH)_3$ or $Al_2O_3 \cdot nH_2O$.

The aluminum-containing component is not particularly limited. Examples thereof include aluminum hydroxide, aluminate, or hydrate or solvate thereof. Among them, aluminate, or hydrate or solvate thereof is preferred in view of solubility in water and easy handleability.

The amount of the aluminum-containing component to be added is not particularly limited. When the aluminum-containing component is present in the composite particles, the amount thereof is preferably 0.01 to 10% by mass (in terms of $Al_2O_3$) for 100% by mass (in terms of $TiO_2$) of titanium components. The lower limit of the amount is more preferably 0.5% by mass, still more preferably 1% by mass, whereas the upper limit is more preferably 5% by mass, still more preferably 3% by mass. The proportion of the aluminum hydroxide exceeding 10% by mass of the base may impair some properties such as opacifying property, which are required as innate properties of titanium dioxide-containing particles.

As explained above, the second coating layer (hydroxide layer) is provided in the step (3), and then composite particles are isolated from the resultant mixture in the step (4).

A way of isolating composite particles from a mixture (e.g. suspension, slurry, etc.) is not particularly limited. Composite particles may be isolated by a known separating technique such as filtration under an ordinary pressure or under reduced pressure, centrifugation, or decantation.

The steps (3) and (4) which may optionally be performed after the steps (1) and (2) provide a hydroxide layer that contains aluminum hydroxide on the surface of the composite particles, thereby providing composite particles which have excellent dispersibility in a resin. Thus, when a coating film is made from the resin dispersion, for example, a glossy coating film may be provided.

The composite particles of the present invention may further include an optional polysiloxane layer. The polysiloxane layer will hydrophobize the surface of the composite particles, or will modify organic substances having a functional group present on the surface. As a result, easy dispersibility and dispersion stability in a dispersing medium may be provided.

Examples of the polysiloxane include alkylhydrogenpolysiloxanes such as methylhydrogenpolysiloxane, and dialkylpolysiloxanes such as dimethylpolysiloxane.

The polysiloxane layer may be formed on the composite particles by, for example, mixing the composite particles obtained through the step (4) with polysiloxane by a mixing means such as a mixer, followed by heating treatment.

(Application of the Composite Particles of the Present Invention)

The composite particles of the present invention can suitably be used in various fields such as top coatings for automobiles, buildings, or building materials, plastics, or inks, in which titanium dioxide pigments and titanium dioxide-containing particles has been used. The composition such as a cosmetic composition, a coating composition, a resin composition, or an ink composition which contains the composite particles, and a molded article produced from the resin composition are within the scope of the present invention.

The cosmetic composition may be in any form, such as liquid, emulsion, solid, paste, or gel. The formulation of the cosmetic composition may be anyone of common cosmetic formulations, such as lotion, emulsion, or cream.

The cosmetic composition may contain the composite particles of the present invention and cosmetically acceptable optional components. Examples of the above components include higher alcohols containing 8 or more carbon atoms, such as octyl alcohol, nonyl alcohol, decyl alcohol, undecyl alcohol, lauryl alcohol, myristyl alcohol, cetyl alcohol, cetostearyl alcohol, isocetyl alcohol, oleyl alcohol, stearyl alcohol, isostearyl alcohol, arachyl alcohol, behenyl alcohol, jojoba alcohol, octyldodecanol, and hexyldecanol; higher fatty acids containing 6 or more carbon atoms, such as caproic acid, caprylic acid, capric acid, 2-ethylhexanoic acid, lauric acid, myristic acid, myristoleic acid, coconut oil fatty acid, tallowate, palm oil fatty acid, palmitic acid, palmitoleic acid, stearic acid, oleic acid, isostearic acid, linoleic acid, linolenic acid, arachidic acid, behenic acid, arachidonic acid, and erucic acid; animal or vegetable fats and oils such as olive oil, corn oil, peanut oil, rapeseed oil, sesame oil, soybean oil, coconut oil, palm oil, palm kernel oil, castor oil, linseed oil, jojoba oil, camellia oil, sunflower oil, macadamia nut oil, tea seed oil, cottonseed oil, perilla oil, safflower oil, peach kernel oil, beef tallow, and lard; vitamins, UV absorbers, water-soluble polymers, antioxidants, anionic surfactants, cationic surfactants, amphoteric surfactants, nonionic surfactants, sequestering agents, solvents such as lower alcohols, thickeners such as polysaccharides, preservatives, colorants, and powder.

Examples of the resin constituting a coating composition, a resin composition, or an ink composition may include, but not limited to, fluorine resin, acrylic polyol, acrylic resin, acrylic silicone, polyester resin, melamine resin, urethane resin, polyamide resin, polyolefin resin, epoxy resin, and polycarbonate resin.

The solvent contained in the coating composition or ink composition is not particularly limited. Examples thereof include organic solvents such as toluene, xylene, methyl ethyl ketone, ethyl acetate, alcohols, and Solvesso <trade name>; and water.

The coating composition, resin composition, and ink composition may optionally include resin stabilizers, plasticizers, curing agents, dispersants, antifoaming agents, viscosity modifiers, antioxidants, and other organic or inorganic pigments such as carbon black, iron oxide, aluminum cobalt, copper phthalocyanine, perylene, and bismuth vanadate.

EXAMPLES

Hereafter, the present invention will be explained in more detail referring to Examples, but the present invention is not limited to these examples. In the Examples, "part(s)" and "%" mean "part(s) by mass" and "% by mass", respectively unless otherwise noted.

Example 1

First Step $TiO_2$ particles (average particle diameter: 0.26 μm) produced through sulfuric acid process was added to water, to prepare aqueous slurry ($TiO_2$ concentration: 400 g/L). This slurry (0.5 L) was heated to 80° C. under stirring. While maintaining this temperature, a 150 g/L aqueous solution of sodium silicate, which corresponded to 5% by mass (in terms of $SiO_2$) of $TiO_2$, was added to the slurry. Then, 30% sulfuric acid was added thereto over 120 minutes such that the pH of the mixture should be 7. The resultant slurry was aged for 30 minutes. Next, under stirring, the temperature of the slurry was regulated so as to be 40° C. While the pH of the slurry was maintained to 7, a 100 g/L aqueous solution of zirconium oxychloride, which corresponded to 1% by mass (in terms of $ZrO_2$) of $TiO_2$, and 30% aqueous sodium hydroxide were added to the slurry as a single portion over 60 minutes. The resultant slurry was aged for 30 minutes. Then, under stirring, while the pH of the slurry was maintained to 7, a 250 g/L aqueous solution of sodium aluminate, which corresponded to 2% by mass (in terms of $Al_2O_3$) of $TiO_2$, and 30% sulfuric acid were added as a single portion to the slurry over 60 minutes. The resultant slurry was aged for 60 minutes. Thus, on the surface of $TiO_2$, coating layers of silicon hydroxide, zirconium hydroxide, and aluminum hydroxide were formed in the order as set forth.

Second Step

The slurry was washed and then solid matters were separated from liquid matters. The obtained solid matters were calcined at 900° C. for 1 hour, to prepare calcined product having oxide layers.

This calcined product was milled with a fluid energy mill, to thereby produce the composite particles of the present invention (Sample A).

Example 2

The first and second steps were performed in the same manner as Example 1. That is, in the first step, the coating layers of hydrous silica, hydrous zirconia, and hydrous alumina were formed in the order as set forth, and then in the second step, the resultant solid matter was calcined at 900° C. for 1 hour, to prepare a calcined product having oxide layers.

Third Step

The calcined product produced through the second step was added to water, to prepare 400 g/L aqueous $TiO_2$ slurry. Under stirring, the temperature of this slurry (0.5 L) was regulated to 40° C. While the pH of the slurry was maintained to 7, a 250 g/L aqueous solution of sodium aluminate, which corresponded to 3% by mass (in terms of $Al_2O_3$) of $TiO_2$, and 30% sulfuric acid were added to the slurry as a single portion over 60 minutes. The resultant slurry was aged for 60 minutes. Thus, a coating layer of aluminum hydroxide was formed.

Fourth Step

The resultant slurry was washed, and then solid matters were separated from liquid matters. The obtained solid matters were dried at 120° C. for 8 hours, followed by milling by a fluid energy mill, to thereby produce the composite particles of the present invention (Sample B).

Example 3

The first and second steps were performed in the same manner as Example 1. That is, in the first step, the coating layers of hydrous silica, hydrous zirconia, and hydrous alumina were formed in the order as set forth, and then in the second step, the resultant solid matter was calcined at 900° C. for 1 hour, to prepare a calcined product having oxide layers.

Next, the third step was performed as follows. Under stirring, the temperature of aqueous slurry of the above calcined product (0.5 L) was regulated to 40° C. While maintaining the pH of the slurry to be 7, a 100 g/L aqueous solution of titanyl sulfate, which corresponded to 1% by mass (in terms of $TiO_2$) of $TiO_2$. Next, 30% sulfuric acid was added to the slurry over 10 minutes for neutralization, and the slurry was aged for 30 minutes. Successively, while the pH of the slurry was maintained to 7, a 100 g/L aqueous solution of zirconium oxychloride, which corresponded to 1% by mass (in terms of $ZrO_2$) of $TiO_2$, and 30% aqueous sodium hydroxide were added to the slurry as a single portion over 60 minutes, and the slurry was aged for 30 minutes. Then, under stirring, while the pH of the slurry was maintained to 7, a 250 g/L aqueous solution of sodium aluminate, which corresponded to 2% by mass (in terms of $Al_2O_3$) of $TiO_2$, and 30% sulfuric acid were added to the slurry as a single portion over 60 minutes. The resultant slurry was aged for 60 minutes. Thus, on the surface of the oxide layers, coating layers of titanium, hydroxide, zirconium hydroxide, and aluminum hydroxide were formed in the order as set forth. The fourth step was performed in the same manner as in Example 2, to thereby produce the composite particles of the present invention (Sample C).

Example 4

The composite particles of the present invention (Sample D) were produced in the same manner as Example 3 except that no aluminum coating layer was formed in the first step of Example 3.

Comparative Example 1

Comparative particles (Sample E) were produced in the same manner as Example 1 except that no zirconium coating layer was formed in the first step of Example 1.

Comparative Example 2

Comparative composite particles (Sample F) were produced in the same manner as Example 2 except that no zirconium coating layer was formed in the first step of Example 2.

Comparative Example 3

Comparative composite particles (Sample G) were produced in the same manner as Example 3 except that no zirconium coating layer was formed in the first step of Example 3.

Comparative Example 4

Comparative composite particles (Sample H) were produced in the same manner as Example 3 except that no zirconium and aluminum coating layers were formed in the first step of Example 3.

Evaluation 1: Evaluation of Weather Resistance

Using samples obtained in the Examples and Comparative Examples, mixture of the components listed in Table 1 was mixed by a paint conditioner (manufactured by Red Devil) for 30 minutes to form dispersion. Thus, coating compositions having a ratio of 1/1 (mass of the resin component/mass of composite particles) were prepared. Then, the resultant coating composition was applied to a bonderized steel plate using a bar coater #50, and baked at 140° C. for 30 minutes, to thereby prepare a test specimen. The test specimen was subjected to an accelerated exposure test in a Sunshine Weather Meter (Type WEL-SUN-DC. B. EM, manufactured by Suga Test Instruments Co., Ltd.) under light irradiation, while spraying pure water at regular intervals. Gloss at 60° was measured at predetermined intervals using a gloss meter (GM-26D: manufactured by MURAKAMI COLOR RESEARCH LABORATORY), and the exposure time required for the gloss at 60° to drop to 50% or lower of the initial gloss at 60° was determined. The longer the exposure time is, the more the weather resistance is excellent. Results are shown in Table 2.

Evaluation 2: Evaluation of Gloss

Coating composition obtained in the process of Evaluation 1 was applied to a glass plate using a 1.5-mill applicator, and baked at 140° C. for 30 minutes, to thereby prepare a coating film. The 20° gloss at start of formation of the coating was measured using a gloss meter (GM-26D: manufactured by MURAKAMI COLOR RESEARCH LABORATORY). Results are shown in Table 2.

Evaluation 3: Whiteness

A sample was pasted with boiled linseed oil according to JIS K 5101 in a Hoover automatic muller, and obtained paste was spread on a glass plate using a 6-mill applicator. The W value of the paste was measured using a color meter (SE-2000: manufactured by Nippon Denshoku Industries Co., Ltd.). Results are shown in Table 2.

TABLE 1

| Ingredient | Amount (g) |
| --- | --- |
| Sample | 56.0 |
| Alkyd resin BECKOSOL J-524: Manufactured by DIC Corporation, Resin solid content: 60% | 65.3 |
| Butylated melamine SUPER BECKAMINE J-820: Manufactured by DIC Corporation, Resin solid content: 60% | 28.0 |
| Xylene | 18.0 |
| 1.5 mmϕ Glass beads | 80.0 |

These ingredients were mixed for 30 minutes to form dispersion using a paint conditioner (manufactured by Red Devil).

TABLE 2

| Example or Comparative Example | Sample Name | Initial 20°gloss | Exposure time required for the gloss at 60 ° to drop to 50% or lower of the initial value (h) | Whiteness W value |
| --- | --- | --- | --- | --- |
| Example 1 | A | 70 | 3360 | 92.00 |
| Comparative Example 1 | E | 68 | 2500 | 90.78 |
| Example 2 | B | 73 | 4080 | 92.30 |
| Example 3 | C | 76 | 4800 | 92.33 |
| Example 4 | D | 77 | 3840 | 92.52 |
| Comparative Example 2 | F | 72 | 2880 | 91.03 |
| Comparative Example 3 | G | 74 | 3120 | 91.18 |
| Comparative Example 4 | H | 73 | 2000 | 92.49 |

As is found from the results in Table 2, composite particles of the Examples 1 to 4, that is, composite particles having oxide layers containing at least silicon oxide and zirconium oxide were excellent in high whiteness and high weather resistance compared with the particles of Comparative Examples 1 to 3, which did not contain zirconium oxide. The third step performed in Examples 2 to 4 contributed to achieve good dispersibility and high gloss, as well as improved weather resistance, as recognized from comparison with the result of Example 1.

Composite particles of Comparative Example 4 did not have oxide layers including zirconium oxide and aluminum oxide. They are high in whiteness, but their weather resistance was low. Thus, gloss deterioration by accelerated exposure proceeded fast.

(Evaluation of Color Variation Depending on Calcination Temperature)

By changing calcination temperature in the second step of Example 1 and Comparative Example 1, change of whiteness, W, by calcination was tested (Example 5, Comparative Example 5). Alternatively, $TiO_2$ particles produced through chloride process (average particle diameter: 0.26 μm) were used in place of those produced through sulfuric acid process in Comparative Example 5, and the relationship between calcination temperature and color variation similarly (Comparative Example 6). Variations of W value between before and after calcination, ΔW, were listed in Table 3. In the table, STD (1), STD (2), and STD (3) mean whitenesses before calcination (initial values) of the particles in Example 5, Comparative Example 5, and Comparative Example 6, respectively.

TABLE 3

| Calcination temperature (° C.) | ΔW in Example 5 | ΔW in Comparative Example 5 | ΔW in Comparative Example 6 |
| --- | --- | --- | --- |
| Uncalcined | STD (1) | STD (2) | STD (3) |
| 400 | −0.03 | −0.12 | −0.30 |
| 500 | −0.03 | −0.23 | −0.42 |
| 600 | −0.07 | −0.68 | −0.91 |
| 700 | −0.20 | −1.11 | −1.20 |
| 800 | −0.36 | −1.36 | −1.27 |
| 900 | −0.41 | −1.48 | −1.49 |
| 1000 | −0.65 | −1.55 | −1.62 |

As is found from the results in Table 3, composite particles of Example 5, that is, composite particles having oxide layers containing silicon oxide, zirconium oxide, and aluminum oxide were excellent in prevention of whiteness deterioration by calcination as compared with the particles of Comparative Examples 5 and 6.

Referential Examples

Variation in Specific Surface Areas by Calcination, and Evaluation of Weather Resistance By changing calcination temperature in the second step of Example 1, variation of specific surface area, initial 20° gloss, and weather resistance of the composite particles were tested.

Analysis 1: Analysis of Specific Surface Area

Specific surface areas were measured based on BET adsorption theory by a specific surface area analyzer (Macsorb model-1201: manufactured by MOUNTECH Co., Ltd.). In the table, "SSA" means a specific surface area.

Analysis 2: Evaluation on Weather Resistance

Exposure time required for the gloss at 60° to drop to 50% or lower of the initial value was determined in the same manner as explained in the above "Evaluation 1: Evaluation of weather resistance". Results are shown in Table 4.

TABLE 4

Variation of Specific Surface Area of particles and weather resistance through calcinations

| Calcination temperature (° C.) | SSA (m²/g) | Initial 20° gross | Exposure time required for the gloss at 60° to drop to 50% or lower of the initial value (h) |
| --- | --- | --- | --- |
| Uncalcined | 24 | 72 | 2000 |
| 400 | 21 | 70 | 2000 |
| 500 | 17 | 70 | 2240 |
| 600 | 15 | 71 | 2800 |
| 700 | 14 | 70 | 3120 |
| 800 | 13 | 71 | 3240 |
| 900 | 13 | 70 | 3360 |
| 1000 | 10 | 63 | 2800 |

From the results in Table 4, it is found that the higher the calcination temperature was, the smaller the specific surface area became. Up to 900° C., initial gloss was little varied, but weather resistance was increased. This indicates that the coating layer formed in the first step may be dehydrated, or condensed, or fused, and thereby the specific surface area became smaller.

The reason why the specific surface area became smaller at a temperature between 900 and 1000° C. may be assumed that, since the initial gloss was extremely lowered, high-temperature calcination caused sintering and agglomeration among the particles, and the particle diameter was grown. When particles are sintered and/or agglomerated, dispersibility of the particles in a coating film may be lowered, and thus surface smoothness of the coating film may be poor, and gloss and weather resistance thereof may be deteriorated. Accordingly, calcination in the step (2) is preferably performed at about 600 to 950° C., more preferably 700 to 950° C.

Example 6

First Step

Fine titanium oxide particle (Sakai Chemical Industry Co., Ltd., STR-100N) was added to water, to prepare 150 g/L aqueous slurry of $TiO_2$. This slurry (5.0 L) was heated to 90° C. under stirring. While maintaining this temperature, a 150 g/L aqueous solution of sodium silicate, which corresponded to 6% by mass (in terms of $SiO_2$) of $TiO_2$, was added to the slurry. Then, 30% sulfuric acid was added thereto over 180 minutes such that the pH of the slurry should be 9. The resultant slurry was aged for 60 minutes. Next, under stirring, the temperature of the slurry was regulated so as to be 45° C. While the pH of the slurry was maintained to 8.5, a 100 g/L aqueous solution of zirconium oxychloride, which corresponded to 3.0% by mass (in terms of $ZrO_2$) of $TiO_2$, and 30% aqueous sodium hydroxide were added to the slurry as a single portion over 90 minutes. The resultant slurry was aged for 30 minutes. Then, under stirring, while the pH of the slurry was maintained to 8.5, a 250 g/L aqueous solution of sodium aluminate, which corresponded to 4.5% by mass (in terms of $Al_2O_3$) of $TiO_2$, and 30% sulfuric acid were added to the slurry as a single portion over 120 minutes. The resultant slurry was aged for 30 minutes. Thus, on the surface of $TiO_2$, coating layers of silicon hydroxide, zirconium hydroxide, and aluminum hydroxide were formed in the order as set forth.

Second Step

The second step was performed in the same manner as in the second step of Example 1 except that the calcination temperature was changed to 800° C. to produce a calcined product.

Third Step

The calcined product obtained through the second step was added to water, and milled with a bead mill, to prepare 150 g/L aqueous slurry of $TiO_2$. Under stirring, the temperature of this slurry (5.0 L) was regulated to 45° C. While the pH of the slurry was maintained to 8.5, a 250 g/L aqueous solution of sodium aluminate, which corresponded to 4% by mass (in terms of $Al_2O_3$) of $TiO_2$, and 30% sulfuric acid were added to the slurry as a single portion over 90 minutes. The resultant slurry was aged for 60 minutes. Thus, a coating layer of aluminum hydroxide was formed.

Fourth Step

The resultant slurry was washed, and then solid matters were separated from liquid matters. The obtained solid matters were dried at 120° C. for 16 hours, followed by milling by a hammer mill.

Fifth Step

Thus-obtained fine titanium oxide particles were placed in a mixer, and then methylhydrogenpolysiloxane (KF-99P, manufactured by Shin-Etsu Chemical Co., Ltd.) was added thereto, followed by 5-minute mixing. The resultant powder was dried at 120° C. for 24 hours using a hot air drier, to prepare composite particles of the present invention.

<Evaluation of Light Fastness>

The following samples were prepared for comparison with the particles of Example 6:

Comparative Example 7

Commercially-available fine particulate titanium oxide, titanium oxide STR-100N (manufactured by Sakai Chemical Industry Co., Ltd.)

Comparative Example 8

A commercially-available, lightfast fine particulate titanium oxide type composite particle, STR-100A-LP (fine particulate titanium oxide composite particles having, on the surface of titanium oxide, coating layers of silicon hydroxide and aluminum hydroxide, which is further treated with methylhydrogenpolysiloxane) (manufactured by Sakai Chemical Industry Co., Ltd.)

One of the above particles, 0.3 g, and white Vaseline (The Japanese Pharmacopoeia), 2.7 g, was kneaded by a Hoover automatic muller. The kneaded matter was placed in a polyethylene container (inner diameter: 30 mm, depth: 10 mm). Thus, a test specimen was prepared. Using a portable UV lamp (manufactured by Ultraviolet Products, Type UVGL-25), UV ray (365 nm) was irradiated to the test specimen. Then, variation of color difference, $\Delta E$, under a predetermined irradiation time was determined.

Color differences were measured by a color-difference meter (Suga Test Instruments Co., Ltd., Type SM-5) on Hunter L, a, and b values. Based on the measurement result, color differences, $\Delta E$, between before and after irradiation was determined by calculation. The smaller the $\Delta E$ is, the better the light fastness is. The results are shown in Table 5. The relationship between UV ray irradiation time and color difference $\Delta E$ was shown in FIG. 1. Here, color difference $\Delta E$ means a value calculated by the following formula: $\Delta E = (\Delta L^2 + \Delta a^2 + \Delta b^2)^{1/2}$.

TABLE 5

| Irradiation time (HR) | $\Delta E$ Example 6 | $\Delta E$ Comparative Example 7 | $\Delta E$ Comparative Example 8 |
|---|---|---|---|
| 0 | 0 | 0 | 0 |
| 1 | 0.6 | 11.9 | 2.6 |
| 2 | 0.7 | 15.4 | 4.0 |
| 4 | 1.0 | 17.6 | 5.7 |
| 20 | 3.1 | 23.3 | 9.2 |
| 24 | 3.6 | 24.1 | 9.8 |
| 45 | 4.8 | 25.8 | 10.8 |
| 48 | 4.9 | 26.0 | 10.9 |
| 50 | 4.9 | 26.2 | 11.0 |
| 70 | 5.2 | 27.5 | 11.2 |
| 72 | 5.2 | 27.5 | 11.3 |

Figure 1:
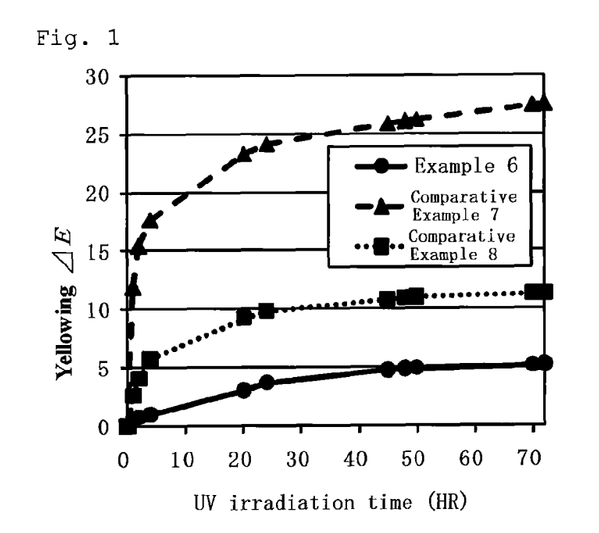
FIG. 1 illustrates a graph representing light fastness of the compositions that contain composite particles obtained according to Example 6 and Comparative Examples 7 and 8.

As is apparent from Table 5 and FIG. 1, the Vaseline mixed with composite particles of Example 6, that is, composite particles having, on the surface of titanium dioxide, oxide layers of silicon oxide, zirconium oxide, and aluminum oxide showed a small color difference $\Delta E$. Accordingly, it is apparent that composite particles having oxide layers according to the present invention had remarkably lowered photocatalytic activity. Composite particles of Comparative Example 8 (which had, on the surface of titanium dioxide, coating layers of silicon hydroxide and aluminum hydroxide) showed a preventing effect against yellowing to some extent compared with commercially-available untreated titanium dioxide particles (Comparative Example 7), but $\Delta E$ was twice or more times higher than the $\Delta E$ of the composite particles of Example 6. Thus, an excellent preventing effect against yellowing of the composite particles of the present invention was demonstrated.

Evaluation 4: Evaluation on Photoactivity

A cosmetic composition containing composite particles of Example 6, commercially-available fine particulate titanium dioxide particles of Comparative Example 7, or commercially-available lightfast fine particulate titanium dioxide type composite particles of Comparative Example 8 was prepared in the following manner. First, oil phase and a powdery sample were mixed using a homogenizer for 5 minutes. Next, aqueous phase was added thereto, and kept mixing for further 25 minutes, to prepare an emulsion sample. Compositions of the above oil phase and aqueous phase were listed in the Table 6 below.

TABLE 6

| | Ingredient | Proportion |
|---|---|---|
| <Oil Phase> | Powdery Sample | 5.0 parts |
| | KF-995 | 15.0 parts |
| | Isohexadecane | 4.0 parts |
| | Cremophor WO7 | 1.5 parts |
| | Cremophor A25 | 0.2 parts |
| | Cetyl Alcohol | 0.5 parts |
| <Aqueous Phase> | Pure Water | 71.8 parts |
| | Simugel NS | 1.5 parts |
| | Xanthan gum | 0.5 parts |
| | Total | 100 parts |

The components listed in Table 6 are as follows: Powdery sample: Composite particles of Example 6, commercially-available titanium dioxide particles of Comparative Example 7, or commercially-available titanium dioxide type composite particles of Comparative Example 8, as mentioned above
KF-995: Cyclic dimethylsilicone oil (manufactured by Shin-Etsu Chemical Co., Ltd.)
Isohexadecane: 2,2,4,4,6,8,8-Heptamethylnonane (manufactured by Tokyo Chemical Industry Co., Ltd.)
Cremophor WO7: PEG-7 hydrogenated castor oil (manufactured by BASF)
Cremophor A25: Ceteareth-25 (manufactured by BASF)

Cetyl alcohol: 1-Hexadecanol (manufactured by Tokyo Chemical Industry Co., Ltd.)

Simulgel NS: (Hydroxyethyl acrylate/sodium acryloyldimethyl taurate) copolymer, squalane, Polysorbate 60, water mixture (manufactured by Seiwa Kasei Co., Ltd.)

Xanthan gum: Xanthan gum (manufactured by Tokyo Chemical Industry Co., Ltd.)

Emulsion obtained according the manner mentioned above were sealed in a clear glass container, and placed in the outdoors on a fine day to expose to direct sunlight for 2 hours. Presence or absence of color change by light irradiation (photochromism) was observed by the eye. The results are shown in Table 7.

TABLE 7

|  | Color of unirradiated sample | Color of irradiated sample |
| --- | --- | --- |
| Example 6 | White | White |
| Comparative Example 7 | White | Blue |
| Comparative Example 8 | White | White |

As is found from the result of the Table 7, emulsions containing particles of Example 6 and Comparative Example 8 did not show photochromism. On the contrary, emulsion containing untreated titanium dioxide showed photochromism such that the color varied from white to blue. Thus, it is found that photoactivity of the composite particles of the present invention was comparable to commercially available lightfast fine particulate titanium dioxide type composite particles, and was remarkably lower than that of the untreated titanium dioxide.

(Light Transmittance)

A coating film was prepared from a composition containing the particles of Example 6 or Comparative Example 8. On the obtained film, total light transmittance and parallel-ray transmittance over a wavelength range from 300 to 800 nm were measured. One gram of a particulate material (powder), 10 g of a resin (manufactured by DIC corporation, ACRYDIC A-801P, 5 g of butyl acetate, and 5 g of xylene was placed in a 50-mL bottle, and then glass beads (1.5 mm diameter) was further added to the bottle. The contents were dispersed using a paint shaker for 90 minutes. Using a #6 bar coater, the coating dispersion obtained above was applied to a slide glass to prepare film having a thickness of 14 μm, and the coated film was dried at an ordinary temperature. The pigment concentration in the dried coated film was 17% by mass. The total light transmittance of the resultant coated film was measured using a spectrophotometer (manufactured by JASCO Corporation, V-570). Visible light transparency was evaluated from parallel light transmittance, and UV shieldability was evaluated from total light transmittance. The results of evaluation are shown in FIGS. 2 and 3.

Figure 2:
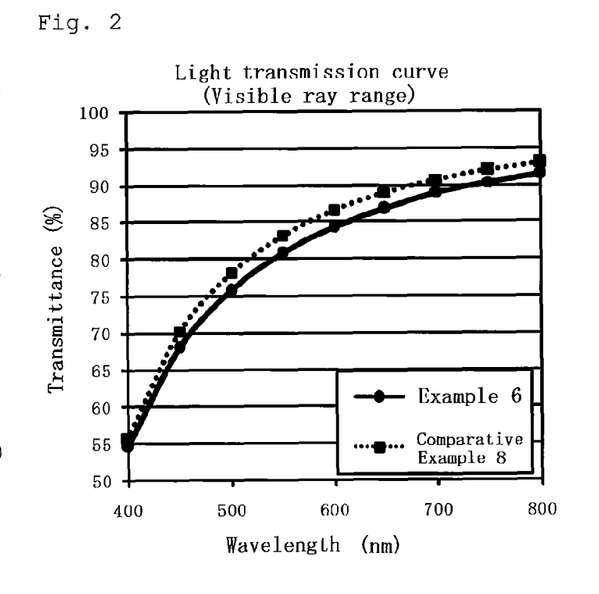
FIG. 2 illustrates measured results of visible ray transmittance of coating layers formed from resin compositions that contain composite particles obtained according to Example 6 and Comparative Example 8.
Figure 3:
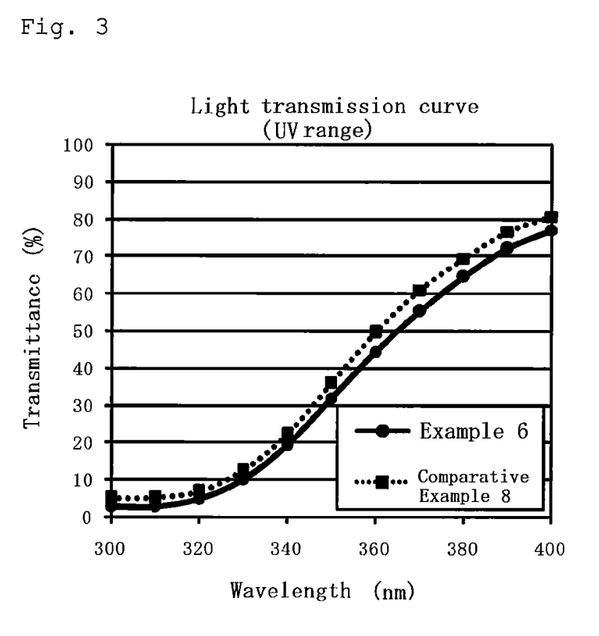
FIG. 3 illustrates measured results of UV-shieldability of coating layers formed from resin compositions that contain composite particles obtained according to Example 6 and Comparative Example 8.

The FIGS. 2 and 3 indicate that the composite particles of the present invention (Example 6) were dispersed in the resin without agglomeration. These results showed that the composite particles of the present invention (Example 6) had comparable transparency and UV shieldability to the commercially-available titanium oxide type composite particle of Comparative Example 8.

INDUSTRIAL APPLICABILITY

The composite particles of the present invention are titanium dioxide-containing composite particles having high UV protection and high visible light transparency. The composite particles of the present invention have lowered photoactivity, so that they can exert an effect of preventing other ingredients in a cosmetic composition from deterioration caused by titanium dioxide. Accordingly, they can be suitable used as UV-shielding cosmetic composition such as sunscreens or foundations.

The invention claimed is:

1. Composite particles, comprising:
a base that contains titanium dioxide, and
at least one oxide layer that contains silicon oxide and zirconium oxide provided on the base,
wherein the oxide layer comprises a multilayer structure having a plurality of sublayers, including a first sublayer consisting of silicon oxide and a second sublayer consisting of zirconium oxide,
wherein the composite particles further include at least one selected from the following,
(1) a third sublayer consisting of aluminum oxide disposed in the oxide layer, and
(2) a hydroxide layer containing aluminum hydroxide disposed on top of the oxide layer.

2. The composite particles according to claim 1, wherein the oxide layer further comprises at least one element selected from the group consisting of titanium, tin, phosphorus, zinc, and antimony.

3. The composite particles according to claim 1, wherein the hydroxide layer further comprises at least one selected from the following: silicon, titanium, cerium, tin, phosphorus, zinc, antimony, and zirconium.

4. The composite particles according to claim 1, wherein the proportion of the oxide layer is 1.5 to 35% by mass for 100% by mass of the base.

5. The composite particles according to claim 1, wherein the proportion of the hydroxide layer is 0.01 to 20% by mass, in terms of oxides, for 100% by mass of the base.

6. The composite particles according to claim 1, wherein the proportion of the silicon oxide is 1 to 15% by mass and that of the zirconium oxide is 0.5 to 10% by mass for 100% by mass of the base.

7. The composite particles according to claim 1, wherein the proportion of the aluminum oxide is 0.01 to 10% by mass for 100% by mass of the base.

8. The composite particles according to claim 1, wherein the proportion of the aluminum hydroxide is 0.01 to 10% by mass for 100% by mass of the base in terms of oxides.

9. The composite particles according to claim 1, wherein composite particles are in a form of isolated solid particles.

10. The composite particles according to claim 1, further comprising a polysiloxane layer.

11. A composition comprising the composite particles according to claim 1, the composition being a cosmetic composition, a coating composition, a resin composition, or an ink composition.

12. A molded article formed from the resin composition according to claim 11.

* * * * *